United States Patent
Oikawa et al.

(10) Patent No.: US 9,685,256 B2
(45) Date of Patent: Jun. 20, 2017

(54) WIRE HARNESS (71) Applicant: SUMITOMO WIRING SYSTEMS, LTD., Mie (JP)

(72) Inventors: Seiji Oikawa, Mie (JP); Masataka Wakabayashi, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 15/274,072

(22) Filed: Sep. 23, 2016

(65) Prior Publication Data
US 2017/0110216 A1 Apr. 20, 2017

(30) Foreign Application Priority Data
Oct. 14, 2015 (JP) .................................. 2015-202866

(51) Int. Cl.
H01B 7/00 (2006.01)
H02G 3/04 (2006.01)

(52) U.S. Cl.
CPC ......... *H01B 7/0045* (2013.01); *H02G 3/0406* (2013.01); *H02G 3/0481* (2013.01)

(58) Field of Classification Search
CPC .. H01R 4/2466; H01R 4/2454; H01R 4/2412; H01R 4/2491; H01R 4/24; H01R 4/2404; H01R 4/2416; H01B 7/0045; H01B 7/282
See application file for complete search history.

(56) References Cited

U.S. PATENT DOCUMENTS

| | | |
|---|---|---|
| 5,690,505 A | 11/1997 | Hirata |
| 2003/0054684 A1* | 3/2003 | Yamanashi .......... H01R 4/2466 439/397 |
| 2003/0153207 A1* | 8/2003 | Lin ...................... H01R 4/2454 439/402 |
| 2005/0227529 A1* | 10/2005 | Mrakovich .......... H01R 4/2433 439/402 |
| 2005/0280484 A1* | 12/2005 | McLauchlan ........ H01R 4/2433 333/185 |
| 2006/0048965 A1* | 3/2006 | Ootsuki ................. H01R 4/22 174/74 A |

(Continued)

FOREIGN PATENT DOCUMENTS

| | | |
|---|---|---|
| JP | 09-022745 | 1/1997 |
| JP | 2006-228539 | 8/2006 |

*Primary Examiner* — Hoa C Nguyen
*Assistant Examiner* — Amol Patel
(74) *Attorney, Agent, or Firm* — Greenblum & Bernstein, P.L.C.

(57) ABSTRACT

In a splice connection member, a core wire holder is integrally formed on an interior of each of a plurality of depressions into which coated wires can be guided. A plurality of pressure blades are provided opposite each other on a wire introduction opening side of the depressions, the pair of pressure blades separated by a distance smaller than an inlet diameter of the wire introduction opening. Each of the pressure blades includes a plurality of blade tips separated by a distance in an axis direction of the coated wires smaller than a thickness of the coating, and the core wire holder includes a plurality of pressure portions. A communicating groove is formed in each of the depressions so as to be open on two ends, passing between the plurality of pairs of blade tips, the communicating groove extending in a circumference direction of each of the coated wires.

5 Claims, 8 Drawing Sheets (56) References Cited

U.S. PATENT DOCUMENTS

| | | | |
|---|---|---|---|
| 2007/0082539 A1* | 4/2007 | Pavlovic | H01R 4/2458 439/400 |
| 2007/0243752 A1* | 10/2007 | Taylor | H01R 4/245 439/409 |
| 2008/0081507 A1* | 4/2008 | Mahajan | H01R 4/2404 439/410 |
| 2010/0210133 A1* | 8/2010 | Mochizuki | F21S 48/212 439/421 |
| 2011/0117769 A1* | 5/2011 | Okamura | H01R 4/185 439/395 |
| 2015/0072568 A1* | 3/2015 | Mori | H01R 13/10 439/733.1 |
| 2015/0162670 A1* | 6/2015 | Galla | H01R 43/01 29/872 |
| 2015/0288078 A1* | 10/2015 | King, Jr. | H01R 4/2433 174/70 R |

* cited by examiner

WIRE HARNESS

CROSS-REFERENCE TO RELATED APPLICATIONS

The present application claims priority under 35 U.S.C. §119 of Japanese Application No. 2015-202866, filed on Oct. 14, 2015, the disclosure of which is expressly incorporated by reference herein in its entirety.

BACKGROUND OF THE INVENTION

1. Field of the Invention

The present invention relates to a wire harness, and in particular to a wire harness having a splice connection area where a core wire of a first coated wire is joined to a core wire of a second wire at a middle portion of the first coated wire.

2. Description of Related Art

In many cases, in a wire harness installed in an automobile or the like, a core wire of a coated wire is spliced together with a core wire of a second wire at a middle portion of the coated wire, but in such cases the core wire exposed at the splice connection area and a conductive connecting body are covered by insulating tape, a protective cover, or the like. Also, in a case where the splice connection area is arranged within an area where contact with water may occur, reliable waterproofing is required.

An example of a conventional wire harness having a splice connection area is known in which, for example, a trunk line and a branch line are arranged in a housing provided with a plurality of wire insertion grooves, and a pressure blade having a plurality of slots opposite the wire insertion grooves is mounted to a lid of the housing. When the lid of the housing is closed, coatings of the trunk line and branch line are respectively cut open by the pressure blade and also core wires of each are spliced together by the pressure blade (see, for example, Japanese Patent Laid-open Publication No. H09-022745).

In addition, a configuration is known in which a resin mold covers a splice connection area as well as both edge portions of a coating (see, for example, Japanese Patent Laid-open Publication No. 2006-228539).

However, in the first conventional wire harness, where the core wires of both the trunk line and branch line are spliced together by the pressure blade, although splicing workability is favorable, the splice connection area is covered by a lidded housing, leading to the following circumstances.

Specifically, the splice connection area cannot be reliably waterproofed by the housing, and in a case where negative pressure occurs inside the coated wire while the wire harness is in use, for example, water that has adhered in the vicinity of the splice connection area may enter the coated wire and could potentially cause short circuit or the like.

In contrast, the second conventional wire harness, in which the splice connection area and both edge portions of the coating are covered by the resin mold, is capable of waterproofing which prevents water from entering the splice connection area. However, not only does a task of molding the resin mold require time and effort, but the water sealing performance is inadequate and cannot prevent water entering the coated wire at other portions from passing through the splice connection area via capillary action, for example, and entering a control circuit or the like.

SUMMARY OF THE INVENTION

In order to resolve the above-noted circumstances, the present invention provides a wire harness which is capable of achieving both favorable splicing workability, as well as a high degree of waterproofing and water sealing, in a case where an exposed core wire of a coated wire is spliced together with a core wire of a second wire at a middle portion of the coated wire.

A water sealing structure of a coated wire according to the present invention is a wire harness provided with a plurality of coated wires each having a portion of a core wire coated by an insulating coating material exposed to an exterior of the insulating coating material at an axis direction portion of the coated wire, and a splice connection member having a plurality of conductor contact portions in contact with the core wires of the plurality of coated wires. The splice connection member includes a plurality of depressions into which the coated wires can be guided, and is provided with the plurality of conductor contact portions integrally formed on an interior of each of the plurality of depressions. A plurality of pairs of pressure blades are provided opposite each other on a wire introduction opening side of the plurality of depressions of the splice connection member, the pair of pressure blades being separated by a distance smaller than an inlet diameter of the wire introduction opening. Each of the pressure blades includes a plurality of blade tips separated by a distance in the axis direction of the coated wires smaller than a thickness of the coating, and the conductor contact portions include a plurality of pressure portions separated in the axis direction of the coated wires. A communicating groove is formed in each of the plurality of depressions so as to be open on two ends, passing between the plurality of pairs of mutually opposing blade tips, the communicating groove extending in a circumference direction of the coated wires between the plurality of pressure portions.

According to this configuration, in the present invention, a communicating pathway corresponding to a communicating groove formed between the splice connection member and the plurality of spliced core wires of the coated wires, and even as the coating of the plurality of coated wires is sliced open by the pressure blades of the splice connection member and splice connections are formed between the core wires, a water sealant can infiltrate inside the coated wires in the vicinity of the splice connection member, through the communicating pathway, enabling both waterproofing and water sealing at the splice connection area.

The wire harness according to the present invention can be configured such that the water sealant infiltrates inside the coated wires in the vicinity of the splice connection member, through the communicating pathway formed along the communicating groove between the splice connection member and the core wires of the coated wires.

In addition, the splice connection member may be configured by a plurality of parallel plates separated from each other in an axis direction of the coated wires; and a connecting portion integrally connecting the plurality of parallel plates to each other. Each of the plurality of parallel plates may be configured to include a plurality of conductor contact portions, a plurality of depressions, and a plurality of pairs of pressure blades. Moreover, the water sealant may be configured by a resin cured in a state where the resin has infiltrated to the interior of the coated wires.

According to the present invention, a wire harness can be provided which is capable of achieving both favorable splicing workability, as well as a high degree of waterproofing and water sealing, in a case where an exposed core wire of a coated wire is spliced together with a core wire of a second wire at a middle portion of the coated wire.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Embodiments of the present invention are described below.

First Embodiment

FIGS. 1 to 7 illustrate a first embodiment of a wire harness according to the present invention. The present embodiment applies the present invention to an automobile wire harness, and is configured such that a first coated wire is spliced together with an end portion of a second coated wire at a middle portion of the first coated wire.

First, a configuration of the present embodiment is described.

Figure 1:
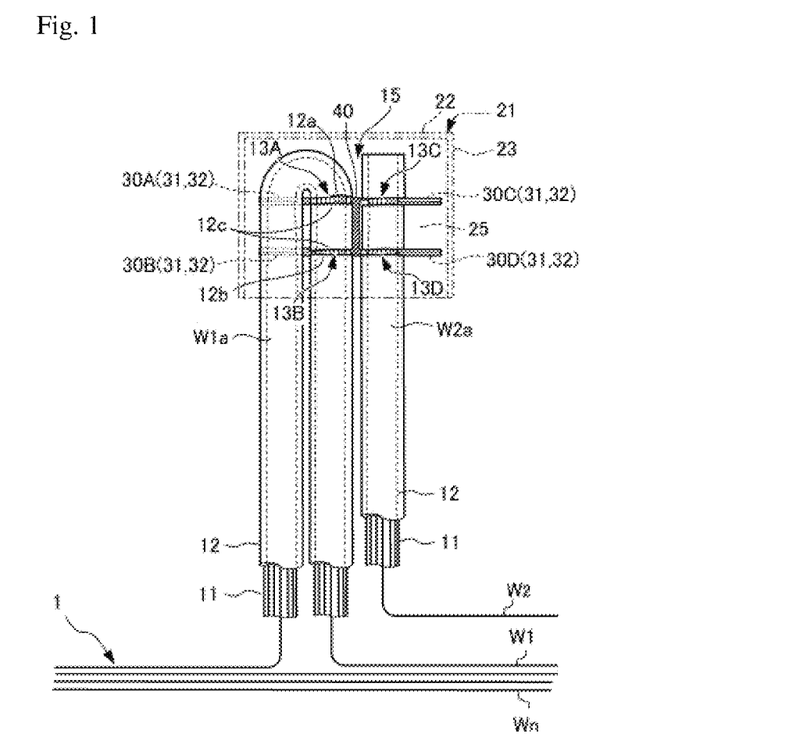
FIG. 1 is a schematic front view illustrating relevant portions of a wire harness according to a first embodiment of the present invention.

As shown in FIG. 1, a wire harness 1 according to the present embodiment includes a plurality of coated wires W1 to Wn (where n is a natural number equal to or greater than 2) having an insulating coating. A middle portion W1$a$ of any first coated wire W1 is spliced together with an end portion W2$a$ of any second coated wire W2.

Figure 7:
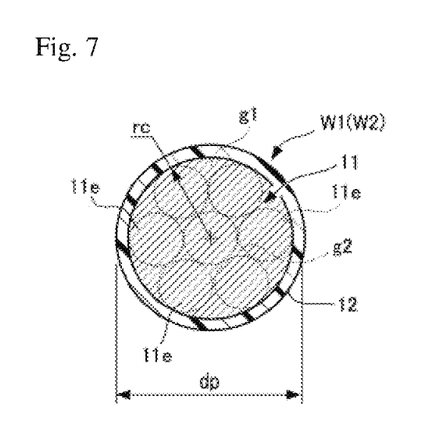
FIG. 7 is a lateral cross-sectional view of a coated wire in the wire harness according to the first embodiment of the present invention.

As shown in FIGS. 1 and 7, the coated wires W1 and W2 are each configured by a core wire 11 in which a plurality of strands 11$e$ are bundled together; and a coating 12 concentrically surrounding the core wire 11. The core wire 11 is configured by a round twisted wire twisting together a plurality of strands 11$e$, for example of annealed copper wire. However, the core wire 11 may instead be configured by twisted wire compressed into a round shape or a single conductive wire. The coating 12, which is an insulating coating material, is made of resin having polyvinyl chloride resin as a main component, for example.

As shown in FIG. 1, the middle portion W1$a$ (a portion distant from both end portions) in a length direction of the coated wire W1 is bent back to form substantially a "U" shape. A point at the bend of the substantially U-shaped middle portion W1$a$ is positioned so as to be adjacent to the end portion W2$a$ of the coated wire W2, which is straight.

A plurality of linear notched portions 13A and 13B are formed near a curved area of the middle portion W1$a$, and a plurality of linear notched portions 13C and 13D are formed on the end portion W2$a$ of the coated wire W2, the notched portions 13A to 13D being formed so as to extend in a direction intersecting with an axis of the respective core wires 11 and coatings 12. The notched portions 13A to 13D are provided by cutting into the coating 12 in a linear shape by a pressure blade, exposing a portion of the core wire 11 to an exterior of the coating 12. Hereafter, details of the notched portions 13A and 13B of the coated wire W1 are described as exemplary. The notched portions 13C and 13D of the coated wire W2 are substantially identical.

The first notched portion 13A is formed so as to be positioned on both sides of a curve center axis direction (a specific diameter direction orthogonal to the plane of FIG. 1) of the middle portion W1$a$ relative to the core wire 11, near the curved area of the middle portion W1$a$ of the coated wire W1. The notched portion 13A extends on both diameter direction sides in an outer circumferential direction of a lateral cross-section of the coating 12. The notched portion 13A may be a pair of slits forming large openings at a center of an extension direction of each, or may be a single slit forming a large opening at an exterior side of the curve in the middle portion W1$a$.

The second notched portion 13B is formed within a predetermined axis direction region further from the curved area of the middle portion W1$a$ of the coated wire W1 than the first notched portion 13A, so as to be positioned on both axis direction sides of the middle portion W1$a$ relative to the core wire 11. Each of the notched portions 13B also extends in the outer circumferential direction of a lateral cross-section of the coating 12, and further includes an opening shape which opens to the greatest extent at an extension direction center or an exterior side of the curve, much as the notched portion 13A does.

A notch direction of the two notched portions 13A and 13B may be inclined from the axis line of the coated wire W1 and a depicted direction orthogonal to a curve center axis line. In other words, the position, orientation, and number of notches is subject to user discretion.

The curved area of the middle portion W1a of the coated wire W1 is accommodated on an interior of a heat-shrinkable protective member 21 having a substantially capped tube shape that is sealed at one end. The protective member 21 is a sheathing member usable for any of insulation, heat blocking, and mechanical protection. A resin material 25 (described in detail below) capable of waterproofing and water sealing is provided on the interior of the protective member 21.

While accommodated on the interior of the protective member 21 so as to surround the middle portion W1a of the coated wire W1, the resin material 25 infiltrates the interior of the coating 12 of the middle portion W1a through the notched portions 13A and 13B. The resin material 25 hardens in a substantially capped tube shape which covers the notched portions 13A and 13B as well as middle portion edges 12a, 12b, and 12c of the coating 12, which are adjacent to the notched portions 13A and 13B. Furthermore, the resin material 25 has an outer diameter greater than the sum of the diameters of a pair of parallel coatings 12 continuous with the middle portion W1a of the coated wire W1 in the folded back state. The resin material 25 also has a greater length in an axis direction of the protective member 21 than a formation region of the notched portions 13A and 13B.

The protective member 21 includes a sealing portion 22 and a tube portion 23 integrally connected to the sealing portion 22. The sealing portion 22 closes off one end of the protective member 21 while creating a predetermined axis direction separation distance with respect to the notched portions 13A and 13B.

The resin material 25 is formed by a cured layer or semi-cured layer of a resin that cures while adhering closely to the protective member 21 and coated wire W1, for example a low viscosity heat curable resin. Low viscosity refers to a degree of viscosity where an uncured water sealant resin having fluidity has a high degree of adhesion to an area around the core wire 11, which is exposed inside the notched portions 13A and 13B, and readily infiltrates gaps g1 and g2 (see FIG. 7) between the strands 11e near the notched portions 13A and 13B.

Alternatively, the low viscosity may be a degree of viscosity where an uncured water sealant resin having fluidity is capable of infiltrating into the gaps g1 and g2 by, for example, application of negative pressure inside the coated wire W1 or increasing pressure introducing water sealant into the notched portions 13A and 13B to create a pressure differential between two members such that the pressure on the interior of the coated wire W1 is low relative to the pressure of the environment with which the notched portions 13A and 13B are in contact, for example.

A resin material 25, in which a water sealant resin such as the above is cured at least on the exterior of the coated wire W1 and, for example, semi-cured on the interior of the coated wire W1, tightly adheres to the sealing portion 22 between the protective member 21 and the coated wire W1. In addition, the resin material 25 infiltrates inside the coating 12 through the notched portions 13A and 13B while also infiltrating into the notched portions 13A and 13B and inside the gaps g2 formed between the strands 11e.

In addition, the splice connection member 40 is accommodated on an interior of the protective member 21, the splice connection member 40 having a plurality of pairs of pressure blades 31 and 32, each capable of cutting open the coating 12.

As shown in FIGS. 1 to 3B, the splice connection member 40 is configured by a plurality of identically shaped parallel plates 41 and 42, which are separated from each other in a vertical direction in FIG. 1 (the axis direction of the coated wires W1 and W2); and a connecting portion 43 integrally connecting the parallel plates 41 and 42 to each other at a length direction center portion of the parallel plates 41 and 42.

In addition, a depression 30A opening on a first length direction side and a depression 30C opening on a second length direction side are provided to the parallel plate 41 (the upper parallel plate in FIG. 1), and a depression 30B opening on the first length direction side and a depression 30D opening on the second length direction side are provided to the parallel plate 42 (the lower parallel plate in FIG. 1).

Also, a first core wire holder 35 holding the coated wire W1 and a plurality of pairs of pressure blades 31 and 32 are integrally provided to each of the first depressions 30A and 30B. A second core wire holder 35 holding the coated wire W2 and a plurality of pairs of pressure blades 31 and 32 are integrally provided to each of the second depressions 30C and 30D.

Specifically, a keyhole-shaped depression 34 is formed in each of the depressions 30A, 30B, 30C, and 30D. The pair of pressure blades 31 and 32 are arranged in substantially a "V" shape on an inlet side of the depression 34, and the core wire holder 35 (a recessed conductor contact portion) is arranged in the interior of the depression 34.

By forming the plurality of notched portions 13A and 13B in the coating 12 of the coated wire W1 with the plurality of pairs of pressure blades 31 and 32 belonging to the first depressions 30A and 30B, the splice connection member 40 is capable of stripping coating, which exposes a portion of the core wire 11 within the coating 12 to the exterior of the coating 12 without pulling the coating 12 of the coated wire W1 away from the core wire 11. In addition, by forming the plurality of notched portions 13C and 13D in the coating 12 of the coated wire W2 with the plurality of pairs of pressure blades 31 and 32 belonging to the second depressions 30C and 30D, the splice connection member 40 is capable of stripping coating, which exposes a portion of the core wire 11 within the coating 12 to the exterior of the coating 12 without pulling the coating 12 of the coated wire W2 away from the core wire 11.

More specifically, the core wire holder 35 is positioned further to the interior of the depression 34 than the pressure blades 31 and 32 belonging to each of the depressions 30A, 30B, 30C, and 30D, and the core wire holder 35 holds the core wire 11 of the coated wire W1 or W2 in a state where the core wire holder 35 is inside the notched portions 13A, 13B, 13C, and 13D of the coating 12.

Hereafter, an exemplary detailed configuration of the core wire holder 35 on the depressions 30A and 30B side is described. The core wire holder 35 on the depressions 30C and 30D side has a similar configuration.

Figure 3A:
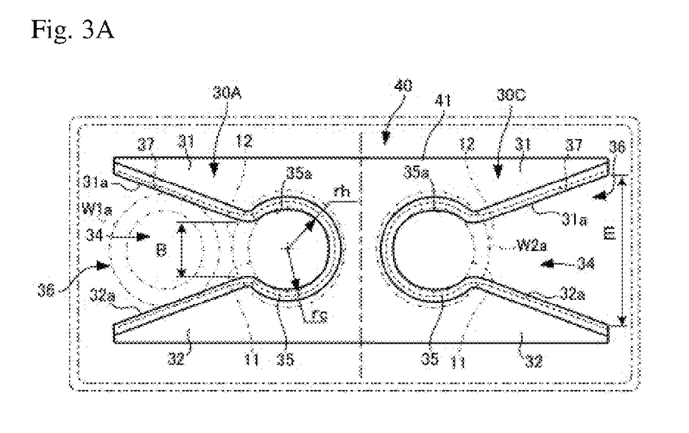
FIG. 3A is a view along a direction of an arrow IIIA in FIG. 2A.
Figure 3B:
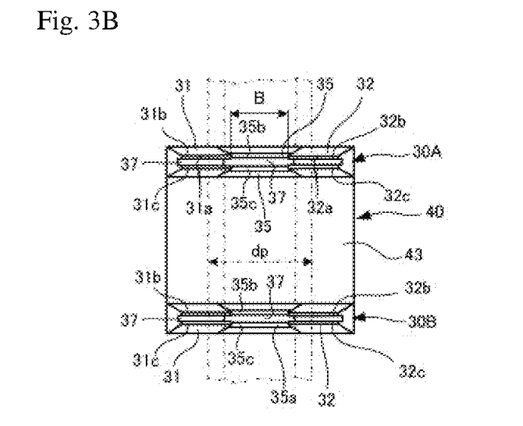
FIG. 3B is a view along a direction of an arrow IIIB in FIG. 2A.

As shown in FIGS. 3A and 3B, the core wire holder 35 includes an inner circumferential wall surface 35a having a horseshoe shape that encompasses at least half a circumference of the core wire 11 of the coated wire W1.

In a case where the core wire 11 is configured by a plurality of strands 11e and the core wire 11 has a substantially elliptical shape in cross-section between the pressure blades 31 and 32, a radius rh of the inner circumferential wall surface 35a is configured to be greater in a depth direction of the depression 34, and smaller in a direction of a minimum distance between blade tips B (separation distance) in FIG. 3A, than a radius rc of the core wire 11 of the coated wire W1. Specifically, whereas the radius rh of the inner circumferential wall surface 35a is defined to be at least the radius rc of the core wire 11 in the depth direction of the depression 34 (rc≤rh), the radius rh of the inner circumferential wall surface 35a is defined to be less than the radius rc of the core wire 11 (rc>rh) in the direction of the minimum distance between blade tips B shown in FIG. 3A, which is orthogonal to the depth direction of the depression 34. Furthermore, in a case where the core wire 11 is compressed into a circular shape or is configured by a single conductive wire, the radius rh of the inner circumferential wall surface 35a is defined to be slightly smaller than the radius rc of the core wire 11 and is smaller than a radius of the coating 12 of the coated wire W1 in each direction (dp/2). The core wire holder 35 may also have a recessed shape in substantially a "U" shape. A width of the inner circumferential wall surface 35a is substantially constant and is, for example, 1 mm or less.

Figure 2A:
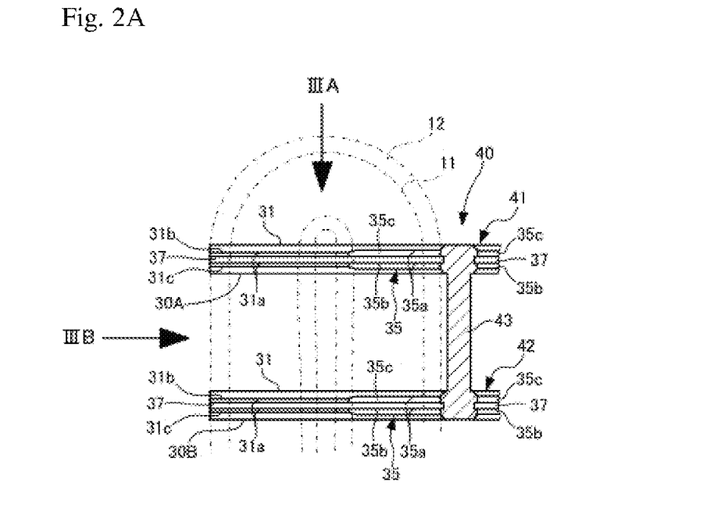
FIG. 2A is a front cross-sectional view of a portion of a splice connection member on the wire harness according to the first embodiment.

As shown in FIGS. 2A and 3A, the inner circumferential wall surface 35a of the core wire holder 35 is adjacent on a first end side to the pressure blade 31 and is adjacent on a second end side to the pressure blade 32.

Moreover, as shown in FIGS. 3A and 3B, the minimum distance between blade tips B, which is the closest approach between pressure blade faces 31a and 32a of the pressure blades 31 and 32, respectively, is substantially identical to the space between the two ends of the inner circumferential wall surface 35a of the core wire holder 35, which is connected to the pressure blade faces 31a and 32a. In other words, the minimum distance between blade tips B is substantially identical to a width of an inlet of the core wire holder 35.

When the coated wire W1 passes through a portion at the minimum distance between blade tips B of the pressure blades 31 and 32, the minimum distance between blade tips B is set to a value slightly smaller than the diameter of the core wire 11 of the coated wire W1 (2rc) so as to enable the pressure blades 31 and 32 to press against the coating 12 and reliably cut the coating 12 open.

The splice connection member 40 includes a plurality of first depressions 30A and 30B and a plurality of second depressions 30C and 30D, into which the plurality of coated wires W1 and W2 can be guided. Also, the splice connection member 40 is provided with a plurality of core wire holders 35 integrally formed on an interior of each of the plurality of depressions 30A, 30B, 30C, and 30D. Furthermore, the plurality of pairs of pressure blades 31 and 32 are provided opposite each other on a wire introduction opening 36 side of the plurality of depressions 30A, 30B, 30C, and 30D of the splice connection member 40, separated by a distance smaller than an inlet diameter E of the wire introduction opening 36.

In this regard, each of the pressure blades 31 and 32 includes, on each of the pressure blade faces 31a and 32a, a plurality of blade tips 31b, 31c, 32b, and 32c, respectively, separated by a distance in the axis direction of the coated wires W1 and W2 smaller than a thickness of the coating 12. Each of the core wire holders 35 includes a plurality of pressure portions 35b and 35c, separated in the axis direction of the coated wires W1 and W2 (see FIG. 2).

A communicating groove 37 is formed in each of the depressions 30A, 30B, 30C, and 30D so as to be open on both length direction ends, passing between the plurality of pairs of mutually opposing blade tips 31b, 31c, 32b, and 32c. The communicating groove 37 extends in the circumference direction of the coated wire W1 or W2 between the plurality of pressure portions 35b and 35c at a length direction center.

Figure 2B:
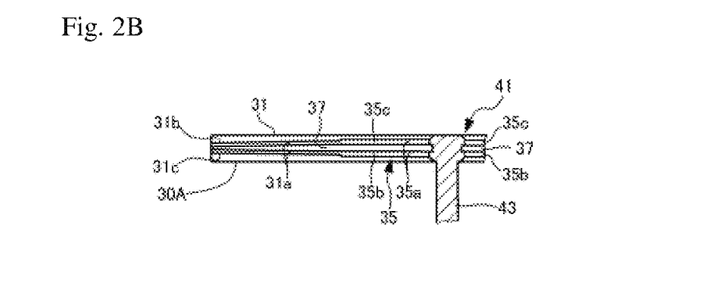
FIG. 2B is a diagram illustrating a modification of the splice connection member.

As shown in FIGS. 2B and 3A, a groove width of the communicating groove 37 may be gradually changed at formation intervals of the pressure blades 31 and 32 so as to narrow on the wire introduction opening 36 side and to widen on the core wire holder 35 side.

Figure 4A:
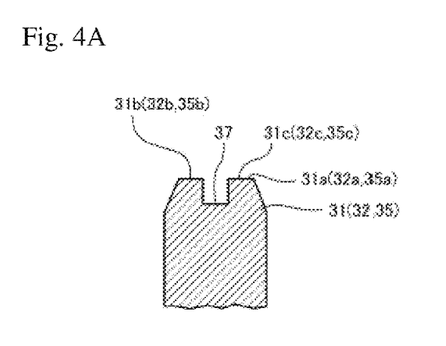
FIGS. 4A to 4C are partial cross-sectional views each illustrating one of three types of a pressure blade of the splice connection member on the wire harness according to the first embodiment of the present invention.
Figure 4B:
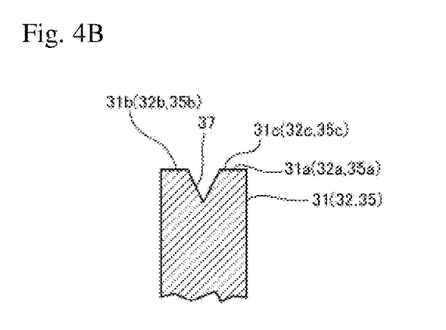

As shown in FIG. 4A, the communicating groove 37 has a rectangular cross-sectional shape, for example. However, the communicating groove 37 may instead have a "V" groove shape as shown in FIG. 4B, or may instead be a "U" groove or arced groove.

Figure 4C:
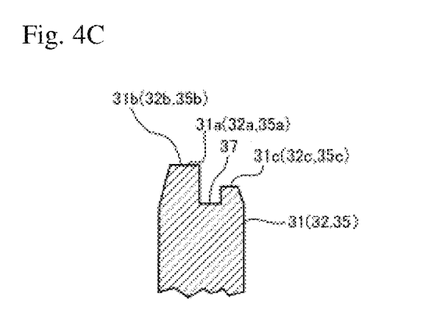

In addition, the plurality of blade tips 31b and 31c on the pressure blade 31 or the plurality of blade tips 32b and 32c on the pressure blade 32, which are separated from each other with the communicating groove 37 therebetween, are positioned on the same plane or the same radius, as shown in FIG. 4A. However, as shown in FIG. 4C, the first blade tip 31b of the pressure blade 31 or the first blade tip 32b of the pressure blade 32 may also be a primary blade tip projecting further than the second blade tip 31c or 32c, and the second blade tip 31c or 32c may be an auxiliary blade tip on the other side of the communicating groove 37 from the primary blade tip, increasing the width of the slice in the coating 12.

Figure 5A:
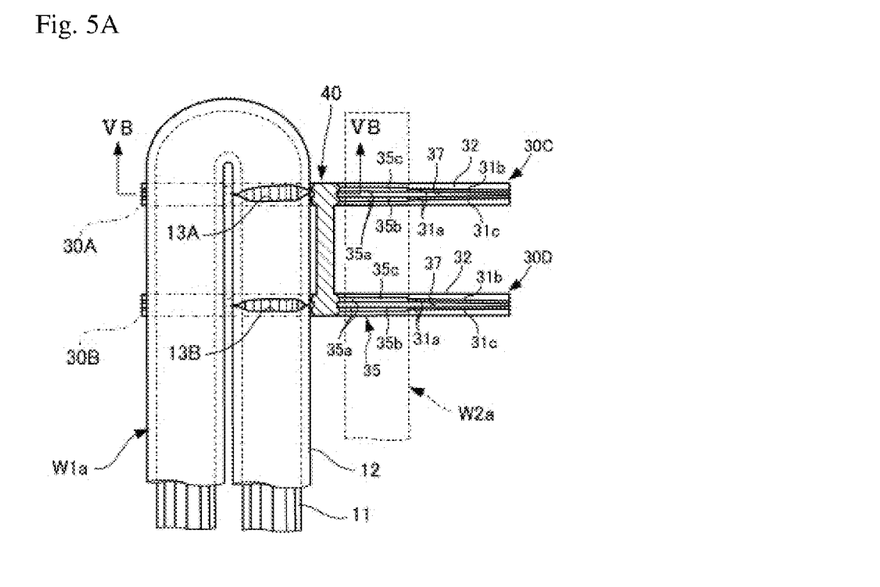
FIG. 5A is a diagram illustrating a notched portion of an insulating coating material at the splice connection area of the wire harness according to the first embodiment.
Figure 5B:
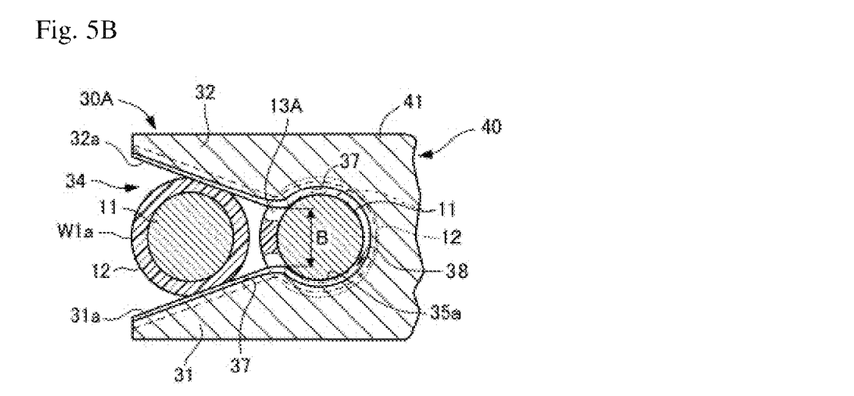
FIG. 5B is a view along a direction of an arrow VB-VB in FIG. 5A.

As shown in FIGS. 5A and 5B, when the middle portion W1a of the coated wire W1 is folded back in a reverse "U" shape and pressed into the depression 34 of the splice connection member 40, the pressure blades 31 and 32 partially slice open the coating 12 due to pressing against the coating 12 and form the notched portions 13A and 13B, and the core wire holder 35 accommodates the exposed core wire 11 that is inside the notched portions 13A and 13B while pinching and holding the core wire 11 from both diameter direction sides.

When the splice connection member 40 is mounted on the core wire 11 of the coated wire W1 in this way, as shown in FIG. 5B, a communicating pathway 38 is formed along the communicating groove 37, between the splice connection member 40 and the core wire 11 held inside the core wire holder 35.

Although not shown in FIG. 5B, the water sealant infiltrates to the interior of the coating 12 of the coated wire W1 near the splice connection member 40, through the communicating pathway 38. The water sealant referred to here is a portion of the resin material 25 which cures in a state where the resin material 25 has infiltrated to the interior of the coated wires W1 and W2. A remainder of the resin material 25 cured on the outside of the coating 12 covers the notched portions 13A and 13B together with cut edge faces of the coating 12 on both sides of the notched portions 13A and 13B, thereby waterproofing the splice connection area 15.

FIG. 5A illustrates an exemplary shape of an opening in the notched portions 13A and 13B of the coating 12 when held by the core wire holder 35, and FIG. 5B illustrates an exemplary cross-sectional view of the middle portion W1a of the coated wire W1, as well as the depression 30A, at the center of the notched portion 13A.

The splice connection member 40 is configured by a material having electrical conductivity and thermal conductivity somewhat greater than both the resin material 25 and the coating 12; for example, a metal such as copper (Cu), which is a conductor.

Next, an exemplary method of manufacturing the wire harness 1 according to the present embodiment is described. The present embodiment first, as shown in a bent back curve stage in FIG. 6, the middle portion W1a of the coated wire W1 is curved into substantially a "U" shape in a bent back direction, after which, as shown in a notched portion formation stage in FIG. 6 as well as in FIGS. 5A and 5B, the splice connection member 40 is engaged to the middle portion W1a of the substantially U-shaped coated wire W1 from one direction, initiating operation of the splice connection member 40.

Specifically, due to the first depressions 30A and 30C of the splice connection member 40, the coating 12 in the curved area of the coated wire W1 is cut open by the pressure blades 31 and 32 without pulling the coating 12 away from the core wire 11, forming the notched portions 13A and 13B on both axis direction (curve center axis direction) sides of the middle portion W1a, the notched portions 13A and 13B exposing a portion of the core wire 11 inside the coating 12 to the exterior of the coating 12.

When forming the notched portions 13A and 13B, in a state where a generated tensile direction stress in the coating 12 in the curved area of the curved coated wire W1 gradually increases toward the exterior of the curve, the pressure blades 31 and 32 cut into the coating 12 in that vicinity and within a predetermined distance of the same. In addition, the notched portions 13A and 13B, which form large openings at the center of the slit length direction, are formed in the middle portion W1a of the coated wire W1 (see FIG. 5A). Also, the notched portions 13A and 13B are positioned at a depth position where the pressure blades 31 and 32 cut into the coating 12, and a portion of the core wire 11 becomes exposed to the exterior of the coating 12.

Next, with the second depressions 30B and 30D of the splice connection member 40, the coating 12 at an end portion W2a of the coated wire W2 is cut open by the pressure blades 31 and 32 without peeling the coating 12, forming the notched portions 13C and 13D which expose a portion of the core wire 11 to the exterior of the coating 12.

Figure 6:
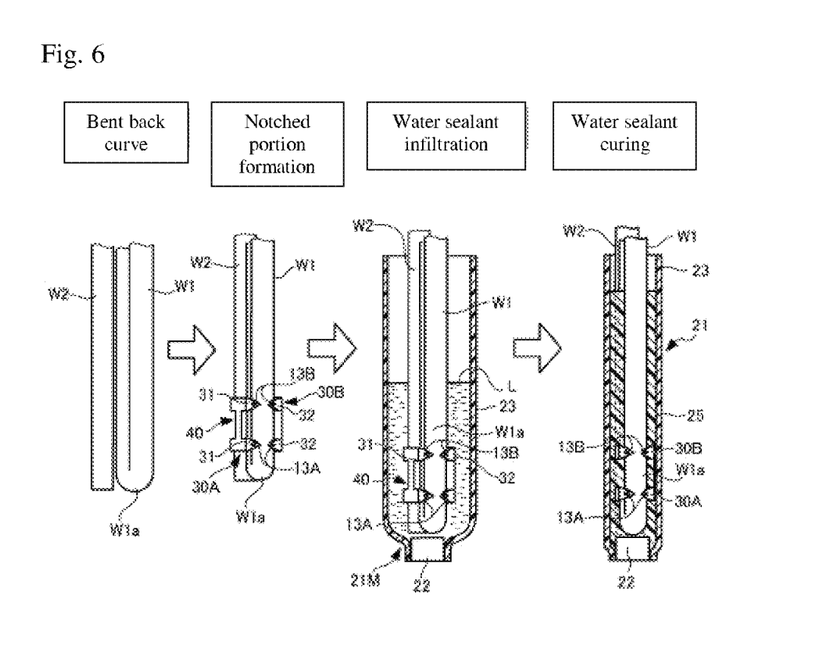
FIG. 6 illustrates a process of manufacturing the wire harness according to the first embodiment of the present invention.

Next, as shown in a water sealant infiltration stage of FIG. 6, a capped tube member 21M for use with the protective member 21 is prepared and a predetermined amount of a low viscosity, uncured resin liquid L (for example, a heat-curable epoxy resin liquid) is introduced into the capped tube member 21M as material for the resin material 25.

At this point, the notched portions 13A and 13B are formed in the coated wires W1 and W2, respectively, and a portion of the core wire 11 is exposed within the notched portions 13A and 13B. Therefore, the low viscosity, high permeability resin liquid L reliably infiltrates through the notched portions 13A and 13B of the coated wire W1 into a water sealing region within the coating 12. Then, a required contact pressure between the splice connection member 40 and the plurality of strands 11e of the core wire 11 is ensured on the interior of the core wire holder 35 of the splice connection member 40. Therefore, a state of electrical connection for the splice connection is also ensured.

Then, as shown in a water sealant curing stage in FIG. 6, in a state where the notched portions 13A and 13B of the coated wires W1 and W2 are immersed in the water sealant, the entire capped tube member 21M is heated from the exterior, causing the tube portion 23 of the capped tube member 21M to contract and the uncured resin liquid L inside the tube portion 23 to harden.

Next, effects of the present embodiment are described.

In the embodiment having the above-described configuration, the notched portions 13A, 13B, 13C, and 13D (hereafter referred to as notched portions 13A and 13B and the like) are formed inside a predetermined region of the coated wires W1 and W2 by the pressure blades 31 and 32, thus eliminating the necessity of peeling away the coating on the predetermined region of the coated wires W1 and W2.

In addition, when the uncured water sealant resin liquid L infiltrates the interior of the coating 12 of the coated wires W1 and W2 through the notched portions 13A and 13B, the water sealant can be readily introduced into the interior of the notched portions 13A and 13B of the coating 12 adjacent to the pressure blades 31 and 32, and can be reliably introduced across a broad circumference direction range, through the communicating pathway 38 formed between the splice connection member 40 and the core wires 11 of the coated wires W1 and W2.

Also, when thermal contraction of the capped tube member 21M and heat curing of the resin liquid L begins from the exterior, internal pressure of the heat curable resin liquid L in an inward direction of the capped tube member 21M tends to increase and the resin liquid L reliably infiltrates through the notched portions 13A and 13B to the interior of the coating 12 of the coated wires W1 and W2. Negative pressure may also be introduced to the interior of the coating 12 from the exterior.

When the capped tube member 21M thermally contracts to a predetermined contraction diameter and heat curing of the heat-curable resin liquid L is complete, the splice connection area 15 capable of waterproofing and water sealing the coated wires W1 and W2 is completed.

In this way, the present embodiment is capable of providing the wire harness 1, which is capable of ensuring a high level of waterproofing and water sealing, through favorable splicing work that does not include a task such as stripping a coating.

In addition, in the present embodiment, a cut open state of the notched portions 13A and 13B is reliably ensured by the plurality of pairs of core wire holders 35 formed on the parallel plates 41 and 42 of the splice connection member 40. Therefore, the state in which the water sealant infiltrates into the coating 12 is kept stable.

Moreover, the communicating pathway 38 corresponding to the communicating groove 37 is formed between the splice connection member 40 and the core wire 11 of the coated wires W1 and W2. Accordingly, even as the coating 12 of the plurality of coated wires W1 and W2 is sliced open by the pressure blades 31 and 32 of the splice connection member 40 and splice connections are formed between the core wires 11, the water sealant can infiltrate inside the coated wires W1 and W2 in the vicinity of the splice connection member 40, through the communicating pathway 38. As a result, the water sealant can reliably infiltrate to the interior of the coating 12 through the notched portions 13A and 13B of the coated wires W1 and W2, and both waterproofing and water sealing at the splice connection area 15 can be achieved.

Additionally, the pair of parallel plates 41 and 42 of the splice connection member 40 each include the plurality of core wire holders 35, the plurality of depressions 30A, 30B, 30C, and 30D, and the plurality of pairs of pressure blades 31 and 32. Therefore, a required state of electrical connection necessary for the splice connection can be kept stable, and in addition the notched portions 13A and 13B can be formed in a uniform shape and the task of mounting the splice connection member 40 on the coated wires W1 and W2 is improved.

In addition, the water sealant is formed by a resin cured in a state where the resin has infiltrated to the interior of the coated wires W1 and W2 and is configured by the resin material 25 (cured layer). Therefore, not only can sealing of the splice connection area 15 of the coated wires W1 and W2 be increased, but connection strength can also be increased.

In this way, the present embodiment is able to provide the wire harness 1, which is capable of achieving both workability in splicing the exposed core wire 11 at the middle portion W1a of the coated wire W1 together with the core wire 11 of the second coated wire W2, as well as a high degree of waterproofing and water sealing.

Second Embodiment

Figure 8:
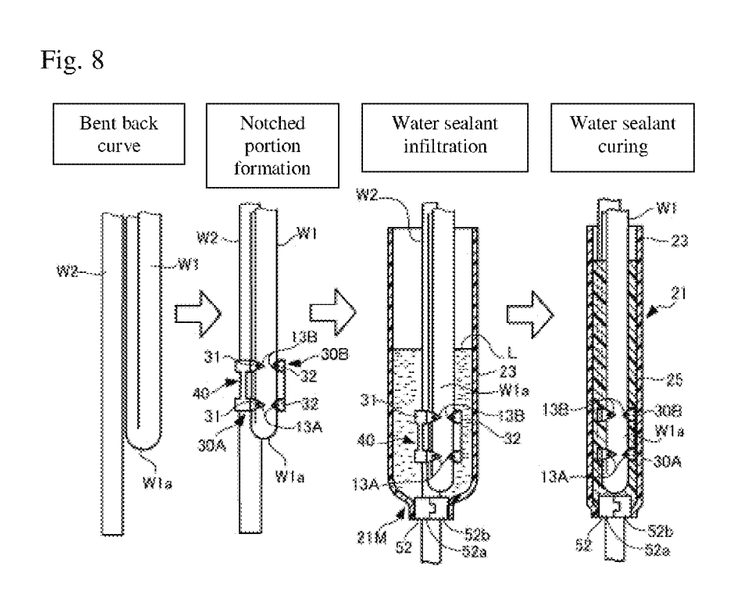
FIG. 8 is a view illustrating a process of manufacturing a wire harness according to a second embodiment of the present invention.

FIG. 8 illustrates an overview of a process of manufacturing a wire harness provided with a coated wire water sealant structure according to a second embodiment of the present invention.

In the first embodiment described above, the middle portion W1a of the coated wire W1 is bent back in substantially a "U" shape. However, the present invention can also be applied to a case where a splice connection is made at a substantially straight middle portion W1a of the coated wire W1 not associated with a bent back curve.

In the present embodiment, the protective member 21 which is mounted to the exterior of the substantially straight middle portion W1a of the coated wire W1 includes an annular stopper 52 (sealing member) instead of the sealing portion 22 to form a complete seal. The stopper 52 is configured by two components mutually engaging in a tongue-and-groove engagement. Other configurations are similar to those of the first embodiment described above, and therefore reference numerals of corresponding configuration elements shown in FIGS. 1 to 7 are used for identical or similar components and only points of difference are described in the following.

Specifically, as shown in a water sealant infiltration stage of FIG. 8, the stopper 52 is configured by an annular member integrally connecting a pair of substantially half-cylindrical stopper members 52a and 52b with a tongue-and-groove engagement. A plurality of annular ribs (not shown in the drawings) separated from each other in an axis direction are provided to an inner circumferential surface of the stopper 52, the inner diameter of which is slightly smaller than the outer diameter of the coating 12. In other words, the stopper 52 is tightly attached to the outer circumference of the coating 12 with a predetermined tightening allowance.

In the present embodiment also, using the splice connection member 40, the coating 12 of the coated wires W1 and W2 can be cut open by the pressure blades 31 and 32 without pulling the coating 12 away from the core wire 11, and the notched portions 13A and 13B can be formed on both axis direction sides of the coated wires W1 and W2, the notched portions 13A and 13B exposing a portion of the core wire 11 inside the coating 12 to the exterior of the coating 12. Accordingly, the present embodiment can achieve effects similar to those of the first embodiment described above.

Moreover, in each of the above-described embodiments, the splice connection member 40 is configured such that depressions 30A and 30B and depressions 30C and 30D, having opposite orientations, are formed on both ends of the pair of parallel plates 41 and 42. However, the splice connection member 40 may instead be configured by only a single plate-shaped member corresponding to the parallel plate 41, or may have three or more parallel plates.

Also, the plate shape of each of the parallel plates 41 and 42 may instead be a polygonal shape other than a rectangle; a non-circular shape such as an ellipse; or a circular shape. In addition, corner portions may be cut away from the substantially rectangular plate shape such as that of the parallel plate 41 shown in FIG. 3A, and the overall shape can be made an elongated substantially hexagonal shape or a substantially elliptical shape. Three or more depressions, each having the pressure blades 31 and 32 on each of the parallel plates 41 and 42, respectively, may be provided so as to open radially outward.

Furthermore, the pressure blades 31 and 32 may be capable of forming the notched portions 13A and 13B in the coating 12 on a single side of the middle portion W1a of the coated wire W1 which is bent back in substantially a "U" shape, and the pressure blades 31 and 32 may also be shortened or the blade tips of the pressure blades 31 and 32 may be crushed at the inlet side of the depression 34. Also, the splice connection member 40 need not be made of copper, and may instead be made of another conductive metal. Naturally, the resin liquid L need not be a heat-curable resin, and may instead be a moisture-curable resin, for example.

In the above, the present invention provides a wire harness capable of ensuring favorable splicing workability as well as waterproofing and water sealing in the splice connection area. The present invention is also useful in general in a wire harness having a splice connection area where a core wire of a first coated wire is joined to a core wire of a second wire at a middle portion of the first coated wire.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A wire harness comprising:
   a plurality of coated wires each having a portion of a core wire coated by an insulating coating material exposed to an exterior of the insulating coating material at an axis direction portion of the coated wire: and
   a splice connection member having a plurality of conductor contact portions in contact with the core wires of the plurality of coated wires, the splice connection member including:
   a plurality of depressions into which the coated wires can be guided, the plurality of conductor contact portions being integrally formed on an interior of each of the plurality of depressions,
   a plurality of pairs of pressure blades provided opposite each other on a wire introduction opening side of the plurality of depressions of the splice connection member, the pair of pressure blades being separated by a distance smaller than an inlet diameter of the wire introduction opening, each of the pressure blades including a plurality of blade tips separated by a distance in the axis direction of the coated wires smaller than a thickness of the coating, and the conductor contact portions including a plurality of pressure portions separated in the axis direction of the coated wires, and a communicating groove formed in each of the plurality of depressions so as to be open on two ends, passing between the plurality of pairs of mutually opposing blade tips, the communicating groove extending in a circumference direction of the coated wires between the plurality of pressure portions.

2. The wire harness according to claim 1, wherein a water sealant infiltrates inside the coated wires in the vicinity of the splice connection member, through a communicating pathway formed along the communicating groove between the splice connection member and the core wires of the coated wires.

3. The wire harness according to claim 2, wherein the water sealant is configured by a resin cured in a condition in which the resin has infiltrated to the interior of the coated wires.

4. The wire harness according to claim 2, wherein the splice connection member is configured by a plurality of parallel plates separated from each other in the axis direction of the coated wires, and a connecting portion integrally connecting the plurality of parallel plates to each other, and each of the plurality of parallel plates includes a plurality of conductor contact portions, a plurality of depressions, and a plurality of pairs of pressure blades.

5. The wire harness according to claim 1, wherein the splice connection member is configured by a plurality of parallel plates separated from each other in the axis direction of the coated wires, and a connecting portion integrally connecting the plurality of parallel plates to each other, and each of the plurality of parallel plates includes a plurality of conductor contact portions, a plurality of depressions, and a plurality of pairs of pressure blades.

* * * * *